United States Patent

Mancioli

[15] 3,638,555
[45] Feb. 1, 1972

[54] DEVICE FOR PRODUCING AN INFUSED LIQUID, PARTICULARLY COFFEE

[72] Inventor: Luciano Mancioli, Altopascio, Lucca, Italy
[22] Filed: Dec. 29, 1969
[21] Appl. No.: 888,675

[30] Foreign Application Priority Data

Dec. 30, 1968 Italy..................................4872 A/68

[52] U.S. Cl............................................................99/303
[51] Int. Cl........................................................A47j 31/057
[58] Field of Search....................99/303, 310, 313, 314, 322; 277/212

[56] References Cited

UNITED STATES PATENTS

| | | | |
|---|---|---|---|
| 1,803,232 | 4/1931 | Carozzi | 99/313 |
| 2,685,248 | 8/1954 | Ohlsson | 99/303 |
| 3,077,156 | 2/1963 | Egi et al. | 99/303 X |
| 3,368,476 | 2/1968 | Mancioli | 99/303 X |

*Primary Examiner*—William I. Price
*Assistant Examiner*—Philip R. Coe
*Attorney*—McGlew and Toren

[57] ABSTRACT

A device for producing an infused liquid, particularly coffee, comprises a sealed vessel in which the liquid is heated. An outlet for the heated liquid from the vessel comprises a first tube extending upwardly from the bottom portion of the vessel into a cup which contains an infusible substance, for example ground coffee, and a second tube extending upwardly from the container and having apertures through which infused liquid is discharged. The tube extends through a tubular inlet of a container removably supported on the vessel, infused liquid discharged from the tube being collected in the container. In order to prevent penetration of liquid between the tube and the inlet, the upper end portion of the tube extends through a passage in a sealing element which acts as a shield to prevent such penetration, both the upper end portion of the tube and the passage in the element being tapered. The element which has a depending skirt surrounding the end portion of the inlet, is removed by the end of the inlet from the tube upon removal of the container from the vessel, and is replaced upon the tube upon replacement of the container.

4 Claims, 4 Drawing Figures

PATENTED FEB 1 1972

INVENTOR
LUCIANO MANCIOLI
BY McGlew & Toren
ATTORNEYS

PATENTED FEB 1 1972 3,638,555
SHEET 2 OF 2
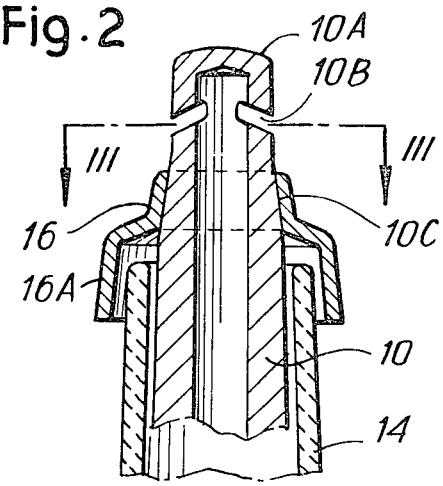
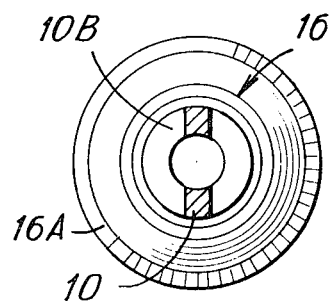
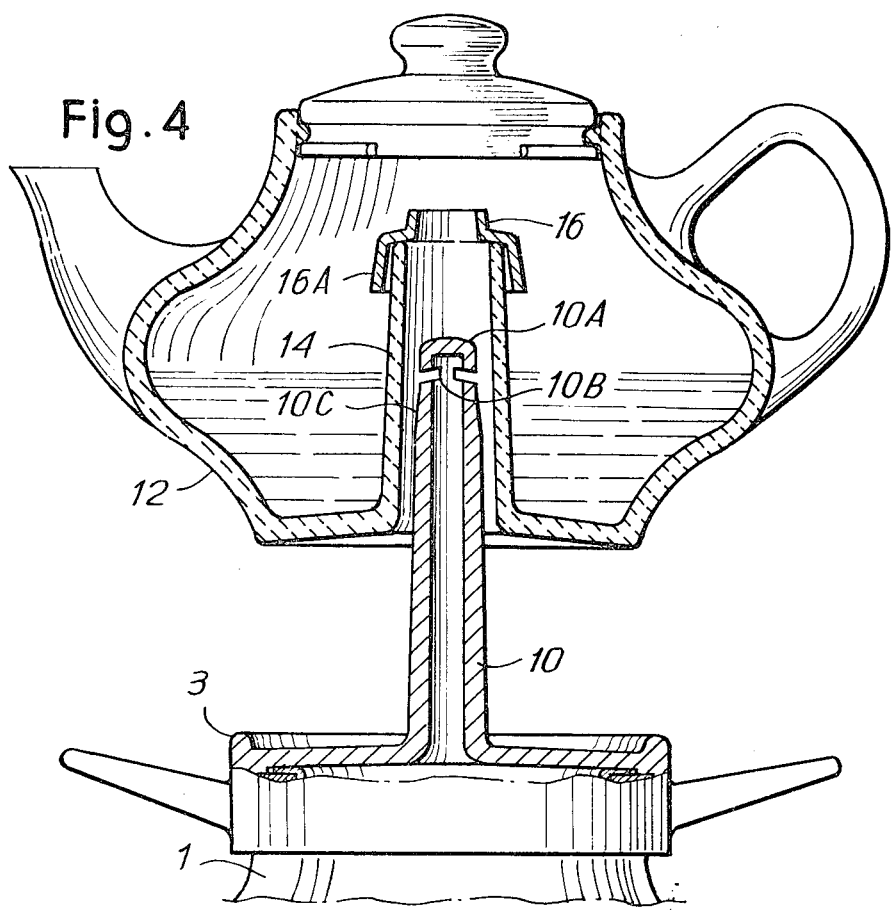
INVENTOR
LUCIANO MANCIOLI
BY McGlew & Toren
ATTORNEYS

DEVICE FOR PRODUCING AN INFUSED LIQUID, PARTICULARLY COFFEE

FIELD OF THE INVENTION

The present invention relates to a device for producing an infused liquid, and more particularly, but not exclusively, to a coffeemaker.

SUMMARY OF THE INVENTION

According to the invention, there is provided a device for producing an infused liquid comprising a sealable vessel in which liquid to be used for infusion can be heated, a passage arranged to extend from the vessel and through which heated liquid can be discharged therefrom, the passage comprising first tube means arranged to extend upwardly substantially from the bottom portion of said vessel, a chamber in communication with the first tube means for containing an infusible substance, and second tube means arranged for communication with the chamber and arranged to extend upwardly therefrom, an upper end portion of the second tube means being tapered, a container arranged to receive infused liquid discharged from the second tube means, the container including an inlet defined by third tube means extending upwardly from the base of the container, the container being arranged to be removably supported upon the vessel such that the second tube means projects through said third tube means into the container, and sealing means having an aperture therethrough, the upper end portion of the second tube means being arranged for sealing engagement within the aperture and the sealing means being of such a size as to shield the upper end of the third tube means and to be removed by the third tube means when the container is removed from the vessel.

BRIEF DESCRIPTION OF THE DRAWINGS

An embodiment of the invention will now be described, by way of example only, with reference to the accompanying drawing, in which:

FIG. 2 is a section, to an enlarged scale, of a part of the maker shown in FIG. 1;

FIG. 3 is a section taken on line III—III of FIG. 2; and

FIG. 4 is a section similar to that shown in FIG. 1 but showing the removal of the infusion container from the boiling vessel.

DESCRIPTION OF THE PREFERRED EMBODIMENT

Figure 1:
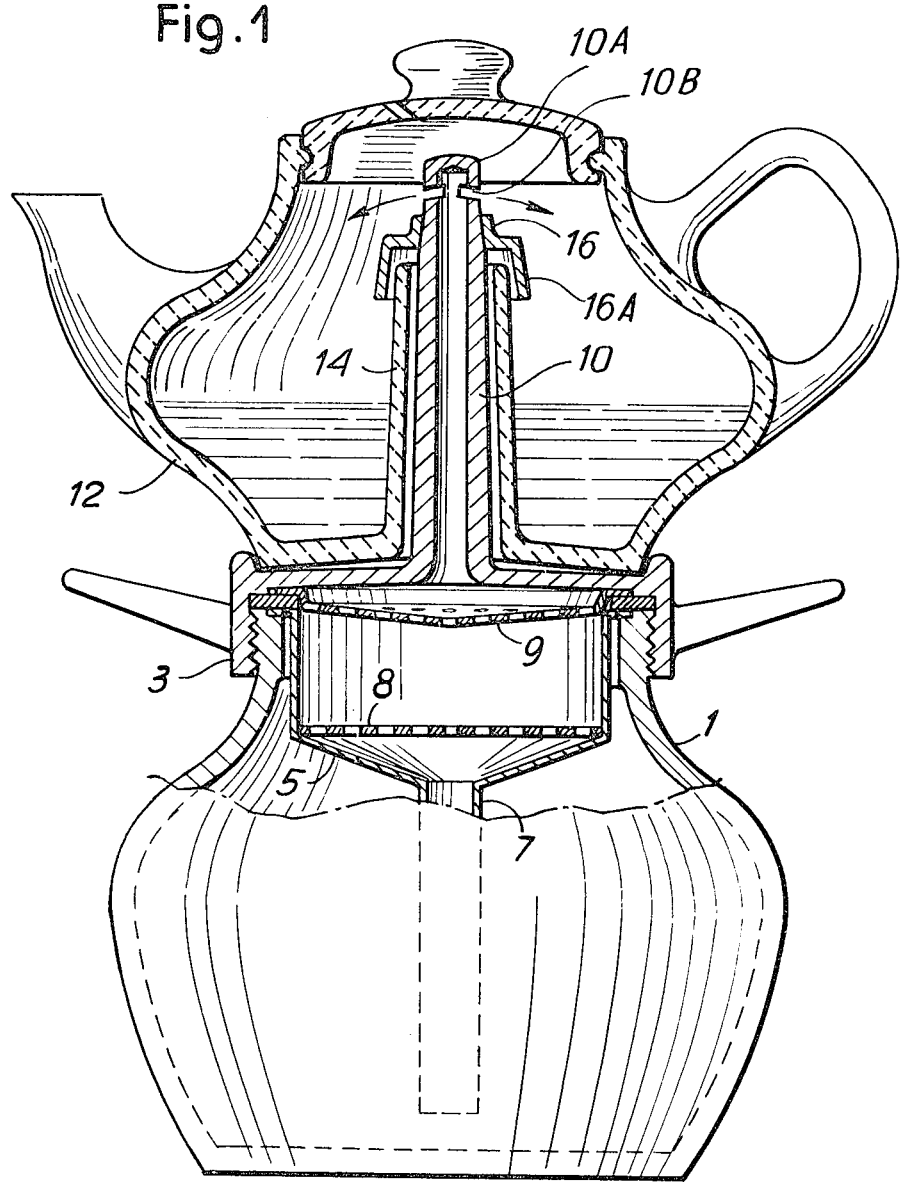
FIG. 1 is a fragmentary vertical section of a domestic coffeemaker assembled for the preparation of infused liquid.

There is shown in the drawings a domestic coffeemaker having a boiling vessel 1. A disc structure 3 is screwed onto an outlet of the boiling vessel and is hermetically sealed thereto. A cup 5, anchored between the vessel and the disc structure 3, comprises a tube 7 which extends upwardly from substantially the bottom portion of the vessel and a filter 8. An upper filter 9 is interposed between the disc structure 3 and the cup 5 so as to define, together with the sidewall of the cup 5 and filter 8, a chamber for containing coffee powder or another infusible substance.

A tube 10, extending upwardly from the disc structure 3, is closed at its upper end 10A and is formed with two slots 10B in its sidewall. Infused liquid is prepared by heating water in the vessel 1. When the pressure within the vessel 1 increases, the water is forced up into the lower tube 7, through the coffee powder and into the tube 10 to be discharged from the slots 10B.

A container 12 in the form of a jug and arranged to contain the infused liquid, is removably supported upon the disc structure 3. The bottom of the container 12 is provided with an upwardly extending tapered tube 14, through which the tube 10 extends, the end portion of the tube 10 projecting beyond the upper edge of the tube 14. As is best seen in FIG. 2 the wall of the end portion of the tube 10 is tapered to provide a frustoconical outer surface 10C arranged for insertion into a correspondingly profiled passage or other aperture through an annular-sectioned sealing element 16, liquid thereby being prevented from penetrating between the element 16 and the wall of the tube 10.

The element 16 is provided with a depending skirt 16A disposed around the upper end portion of the tube 14, and the portion of the element 16 connecting the skirt 16A to the remainder of the element is inclined downwardly.

When the coffeemaker is assembled as shown in FIGS. 1 and 2, the element 16 serves to shield the end of the tube 14 to prevent penetration of the infused liquid discharged from the slots 10B, that is, from entering the gap between the tube 10 and the tube 14, so that the liquid is discharged directly into the container 12.

When the container 12 containing the infused liquid is removed from the vessel 1 the element 16 is retained on the upper edge of the tube 14 and is raised therewith, the skirt 16A being retained on the upper end portion of the tube 14. When the container 12 is replaced upon the vessel 1, the end portion of the tube 10 extends through the end of the tube 14 and is inserted into the frustoconical passage of the element 16, which thereby again serves as a shield to prevent penetration of the discharged liquid.

In the arrangement described, contact with the bottom surface of the vessel 12 by the infused liquid is avoided, and the vessel 12 can be laid on a table cloth or the like.

The coffeemaker described is inexpensive to manufacture and is easily disassembled for washing.

What is claimed is:

1. A device for producing an infused liquid comprising,
a sealed vessel, in which liquid to be used for infusion can be heated,
means defining a passage extending from the vessel and through which heated liquid can be discharged therefrom,
said means comprising,
  first tube means extending upwardly substantially from the bottom portion of said vessel,
  means defining a chamber, in communication with said first tube means, for containing an infusible substance, and
  second tube means in communication with said chamber and extending upwardly therefrom, and upper end portion of said second tube means being tapered,
a container arranged to receive infused liquid discharged from said second tube means, said container comprising means defining an inlet thereto, said means including
  third tube means extending upwardly from the base of the container, the said container being arranged to be removably supported upon said vessel such that the said second tube means projects through said third tube means into the container, and
sealing means, comprising
  means defining an aperture therethrough, the upper end portion of said second tube means being arranged for sealing engagement within said aperture and the said sealing means being of such a size as to shield the upper end of said third tube means and to be removed by said third tube means when the said container is removed from the vessel, an upper portion of said sealing means includes said aperture, said aperture having a taper corresponding to the taper of the said upper end portion of the said second tube means.

2. A device according to claim 1 wherein the said aperture and the said upper end portion of said second tube means are frustoconical.

3. A device according to claim 1 wherein said sealing means comprises
a skirt extending downwardly from the said upper portion thereof and arranged to surround the said upper end of said third tube means.

4. A device according to claim 1, wherein said second tube means has a closed upper end, and slots formed in said second tube means between said closed upper end and said tapered upper end portion.

* * * * *